UNITED STATES PATENT OFFICE.

JOHN A. WHIPPLE, OF BOSTON, MASSACHUSETTS.

IMPROVEMENT IN TAKING DAGUERREOTYPE-PICTURES.

Specification forming part of Letters Patent No. 6,056, dated January 23, 1849.

*To all whom it may concern:*

Be it known that I, JOHN A. WHIPPLE, of Boston, in the county of Suffolk and State of Massachusetts, have invented a new Process for or Improvement in the Process of Producing Daguerreotype-Pictures; and I do hereby declare that the same is fully described in the following specification.

My improvement enables me to produce a daguerreotype miniature of the face of a person resting upon a background which does not exhibit to any material extent the objects in the rear or vicinity of said face, the said background being made to have a cloudy appearance, or one very much like that which is usually given to portraits of faces taken in crayon. For this purpose I usually place a light-colored screen in rear of the sitter. This being done, I take another screen, (which I prefer to have a little darker in color than that of the first,) through which an oval, circular, or other proper shaped aperture has been previously made, the said aperture being cut somewhat larger than the face, head, or object to be daguerreotyped. This latter screen I place in front of and very near to the said object, face, or head of the person, and this I do so as not to intercept the light which is required to fall upon the said object or face of the sitter, in order to produce the light and shade of the picture, the said light being permitted to pass through the aperture of the screen. Holding the screen in this manner generally brings its image exactly, or very nearly, in the focus of the camera obscura when the face or object is brought into the same. The aperture of the second screen is to be made of such a size as will only exhibit to a person looking in the camera the head and such portion of the figure of a person as it may be desirable to represent in the picture, the same appearing through the aperture, while the remainder of the screen intercepts from view such parts as it may be desirable to omit in the picture. The sitter, if under these circumstances a daguerreotype is taken, would be represented as looking through the aperture or hole cut through the screen, the outline of the said hole being clearly defined in the picture; but as we do not wish to produce the said outline or any defined representation of the hole or aperture while the picture is being formed on the camera, we put the screen in motion—that is, we move it slightly and gently up and down laterally and in various directions, so as to prevent any defined outline of the aperture of the screen from being formed on the picture, taking care not to move the said outline into the field to be occupied by the face of the sitter or the object to be represented. In this manner we produce a beautiful blending of the outline of the aperture with the background, or the image of the background-screen, and at the same time intercept from the camera such parts of the dress or person as it may be desirable not to represent. A similar effect may be produced by keeping stationary the screen in which the aperture is made and placing it much nearer to the camera than the person or object to be represented, and so that when the focal distance of the camera is adjusted to the said person or object it shall be out of adjustment with respect to the aperture of the screen—that is to say, so that the image of the aperture shall not be so clearly defined at the focus of the camera as the image of the object or face of the sitter is. The effect, however, is not near so beautiful as that produced by the movable screen arranged and operated as above described. A glass screen made transparent in such parts through which it may be desirable to represent an object, and opaque, or partially so, by paint or other means in other parts, may also be used to advantage.

I do not confine my invention to the use of a screen made of any particular material or materials; but What I do claim as my improvement is—

In combination with the daguerreotype process, the above-specified mode of arranging and operating an opaque, or partially opaque, screen having an aperture or its equivalent, the same being placed between the sitter or object and the camera, and put in motion or maintained in position substantially as above specified.

In testimony whereof I have hereto set my signature this 30th day of August, A. D. 1848.
JOHN A. WHIPPLE.

Witnesses:
FRAS. A. BROOKS,
F. GOULD.